(12) United States Patent
Gribelyuk et al.

(10) Patent No.: US 11,507,657 B2
(45) Date of Patent: *Nov. 22, 2022

(54) SYSTEMS AND METHODS FOR IMPLEMENTING A MACHINE LEARNING APPROACH TO MODELING ENTITY BEHAVIOR

(71) Applicant: Palantir Technologies Inc., Palo Alto, CA (US)

(72) Inventors: Paul Gribelyuk, Jersey City, NJ (US); Han Xu, Singapore (SG); Kelvin Lau, Kew (AU); Pierre Cholet, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/001,472

(22) Filed: Aug. 24, 2020

(65) Prior Publication Data

US 2020/0387606 A1 Dec. 10, 2020

Related U.S. Application Data

(63) Continuation of application No. 16/028,191, filed on Jul. 5, 2018, now Pat. No. 10,754,946.
(Continued)

(51) Int. Cl.
*G06F 21/55* (2013.01)
*G06N 20/00* (2019.01)
*G06F 16/901* (2019.01)

(52) U.S. Cl.
CPC ........ *G06F 21/554* (2013.01); *G06F 16/9024* (2019.01); *G06F 21/552* (2013.01); *G06N 20/00* (2019.01)

(58) Field of Classification Search
CPC .. G06F 21/554; G06F 16/9024; G06F 21/552; G06N 20/00
See application file for complete search history.

(56) References Cited

U.S. PATENT DOCUMENTS 5,819,226 A 10/1998 Gopinathan et al.
5,892,900 A 4/1999 Ginter et al.
(Continued)

FOREIGN PATENT DOCUMENTS

CN 102054015 A 5/2011
CN 102546446 A 7/2012
(Continued)

OTHER PUBLICATIONS

Official Communication for New Zealand Patent Application No. 622513 dated Apr. 3, 2014.
(Continued)

*Primary Examiner* — Yonas A Bayou
(74) *Attorney, Agent, or Firm* — Sheppard Mullin Richter & Hampton LLP

(57) ABSTRACT

Systems and methods are provided for implementing a machine learning approach to modeling entity behavior. Fixed information and periodically updated information may be utilized to predict the behavior of an entity. By incorporating periodically updated information, the system is able to maintain an up-to-date prediction of each entity's behavior, while also accounting for entity action with respect to ongoing obligations. The system may generate behavior scores for the set of entities. In some embodiments, the behavior scores that are generated may indicate the transactional risk associated with each entity. Using the behavior scores generated, a user may be able to assess the credit riskiness of individual entities and instruct one or more individuals assigned to the entities to take one or more
(Continued)

actions based on the credit riskiness of the individual entities.

20 Claims, 6 Drawing Sheets

Related U.S. Application Data

(60) Provisional application No. 62/668,673, filed on May 8, 2018.

(56) References Cited

U.S. PATENT DOCUMENTS

| | | | |
|---|---|---|---|
| 6,094,643 A | 7/2000 | Anderson et al. | |
| 6,430,305 B1 | 8/2002 | Decker | |
| 6,513,018 B1 * | 1/2003 | Culhane | G06Q 40/00 705/35 |
| 6,792,422 B1 | 9/2004 | Stride et al. | |
| 6,820,135 B1 | 11/2004 | Dingman | |
| 6,978,419 B1 | 12/2005 | Kantrowitz | |
| 6,980,984 B1 | 12/2005 | Huffman et al. | |
| 7,168,039 B2 | 1/2007 | Bertram | |
| 7,383,215 B1 * | 6/2008 | Navarro | G06Q 30/02 705/30 |
| 7,529,698 B2 | 5/2009 | Joao | |
| 7,617,232 B2 | 11/2009 | Gabbert et al. | |
| 7,756,843 B1 | 7/2010 | Palmer | |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,036,971 B2 | 10/2011 | Aymeloglu et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,412,604 B1 * | 4/2013 | Graham | G06Q 40/02 705/40 |
| 8,473,454 B2 | 6/2013 | Evanitsky et al. | |
| 8,484,115 B2 | 7/2013 | Aymeloglu et al. | |
| 8,589,273 B2 | 11/2013 | Creeden et al. | |
| 8,600,872 B1 | 12/2013 | Yan | |
| 8,666,861 B2 | 3/2014 | Li et al. | |
| 8,688,573 B1 | 4/2014 | Ruknoic et al. | |
| 8,744,890 B1 | 6/2014 | Bernier | |
| 8,798,354 B1 | 8/2014 | Bunzel et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,032,531 B1 | 5/2015 | Scorvo et al. | |
| 9,100,428 B1 | 8/2015 | Visbal | |
| 9,129,219 B1 | 9/2015 | Robertson et al. | |
| 9,367,872 B1 * | 6/2016 | Visbal | G06F 16/287 |
| 2001/0027424 A1 | 10/2001 | Torigoe | |
| 2002/0065708 A1 | 5/2002 | Senay et al. | |
| 2002/0095658 A1 | 7/2002 | Shulman | |
| 2002/0103705 A1 | 8/2002 | Brady | |
| 2002/0147805 A1 | 10/2002 | Leshem | |
| 2002/0152116 A1 * | 10/2002 | Yan | G06Q 30/02 705/39 |
| 2003/0126102 A1 | 7/2003 | Borthwick | |
| 2004/0034570 A1 | 2/2004 | Davis | |
| 2004/0111480 A1 | 6/2004 | Yue | |
| 2004/0153418 A1 | 8/2004 | Hanweck | |
| 2004/0236688 A1 | 11/2004 | Bozeman | |
| 2005/0010472 A1 | 1/2005 | Quatse et al. | |
| 2005/0086207 A1 | 4/2005 | Heuer et al. | |
| 2005/0133588 A1 | 6/2005 | Williams | |
| 2005/0149455 A1 | 7/2005 | Bruesewitz et al. | |
| 2005/0154628 A1 | 7/2005 | Eckart et al. | |
| 2005/0154769 A1 | 7/2005 | Eckart et al. | |
| 2006/0004872 A1 * | 1/2006 | Tian | G06Q 10/08 |
| 2006/0026120 A1 | 2/2006 | Carolan et al. | |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2007/0000999 A1 | 1/2007 | Kubo et al. | |
| 2007/0011304 A1 | 1/2007 | Error | |
| 2007/0038646 A1 | 2/2007 | Thota | |
| 2007/0061259 A1 | 3/2007 | Zoldi et al. | |
| 2007/0067195 A1 * | 3/2007 | Fahner | G06Q 10/00 705/35 |
| 2007/0106582 A1 | 5/2007 | Baker et al. | |
| 2007/0150801 A1 | 6/2007 | Chidlovskii et al. | |
| 2007/0156673 A1 | 7/2007 | Maga | |
| 2007/0185867 A1 | 8/2007 | Maga | |
| 2007/0239606 A1 | 10/2007 | Eisen | |
| 2007/0284433 A1 | 12/2007 | Domenica et al. | |
| 2008/0046481 A1 | 2/2008 | Gould et al. | |
| 2008/0069081 A1 | 3/2008 | Chand et al. | |
| 2008/0103798 A1 | 5/2008 | Domenikos et al. | |
| 2008/0103996 A1 | 5/2008 | Forman et al. | |
| 2008/0140576 A1 | 6/2008 | Lewis et al. | |
| 2008/0222038 A1 | 9/2008 | Eden et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0301042 A1 | 12/2008 | Patzer | |
| 2008/0313132 A1 | 12/2008 | Hao et al. | |
| 2009/0018996 A1 | 1/2009 | Hunt et al. | |
| 2009/0076845 A1 | 3/2009 | Bellin et al. | |
| 2009/0094166 A1 | 4/2009 | Aymeloglu et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0187546 A1 | 7/2009 | Whyte et al. | |
| 2009/0187548 A1 | 7/2009 | Ji et al. | |
| 2009/0228365 A1 | 9/2009 | Tomchek et al. | |
| 2009/0249244 A1 | 10/2009 | Robinson et al. | |
| 2009/0271343 A1 | 10/2009 | Vaiciulis et al. | |
| 2009/0281839 A1 | 11/2009 | Lynn et al. | |
| 2009/0307049 A1 | 12/2009 | Elliott et al. | |
| 2009/0313463 A1 | 12/2009 | Pang et al. | |
| 2009/0319418 A1 | 12/2009 | Herz | |
| 2009/0319891 A1 | 12/2009 | MacKinlay | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith et al. | |
| 2010/0070842 A1 | 3/2010 | Aymeloglu et al. | |
| 2010/0094765 A1 | 4/2010 | Nandy | |
| 2010/0098318 A1 | 4/2010 | Anderson | |
| 2010/0114887 A1 | 5/2010 | Conway et al. | |
| 2010/0131502 A1 | 5/2010 | Fordham | |
| 2010/0161735 A1 | 6/2010 | Sharma | |
| 2010/0169192 A1 | 7/2010 | Zoldi et al. | |
| 2010/0191563 A1 | 7/2010 | Schlaifer et al. | |
| 2010/0235915 A1 | 9/2010 | Memon et al. | |
| 2010/0262688 A1 | 10/2010 | Hussain et al. | |
| 2010/0312837 A1 | 12/2010 | Bodapati et al. | |
| 2011/0004626 A1 | 1/2011 | Naeymi-Rad et al. | |
| 2011/0055074 A1 | 3/2011 | Chen et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0099628 A1 | 4/2011 | Lanxner et al. | |
| 2011/0131122 A1 | 6/2011 | Griffin et al. | |
| 2011/0137847 A1 * | 6/2011 | Fahner | G06Q 40/02 706/46 |
| 2011/0153384 A1 | 6/2011 | Horne et al. | |
| 2011/0173093 A1 | 7/2011 | Psota et al. | |
| 2011/0208565 A1 | 8/2011 | Ross et al. | |
| 2011/0213655 A1 | 9/2011 | Henkin | |
| 2011/0218955 A1 | 9/2011 | Tang | |
| 2011/0225586 A1 | 9/2011 | Bentley et al. | |
| 2011/0231305 A1 | 9/2011 | Winters | |
| 2011/0270604 A1 | 11/2011 | Qi et al. | |
| 2011/0270834 A1 | 11/2011 | Sokolan et al. | |

(56) References Cited

U.S. PATENT DOCUMENTS

| | | |
|---|---|---|
| 2011/0289397 A1 | 11/2011 | Eastmond |
| 2011/0295649 A1 | 12/2011 | Fine |
| 2011/0307382 A1 | 12/2011 | Siegel et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0131512 A1 | 5/2012 | Takeuchi et al. |
| 2012/0158585 A1 | 6/2012 | Ganti |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0278249 A1 | 11/2012 | Duggal et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0012724 A1 | 1/2014 | O'Leary et al. |
| 2014/0012796 A1 | 1/2014 | Petersen et al. |
| 2014/0040371 A1 | 2/2014 | Gurevich |
| 2014/0058914 A1 | 2/2014 | Song et al. |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange |
| 2014/0195515 A1 | 7/2014 | Baker et al. |
| 2014/0214643 A1* | 7/2014 | Crowe ............... G06Q 40/02 705/35 |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0169709 A1* | 6/2015 | Kara ................ G06Q 10/0639 707/736 |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2018/0174067 A1* | 6/2018 | Spiro ................. G06N 20/00 |
| 2018/0174086 A1* | 6/2018 | Spiro ............. G06Q 10/06313 |
| 2018/0183827 A1* | 6/2018 | Zorlular ............. H04L 41/06 |

FOREIGN PATENT DOCUMENTS

| | | |
|---|---|---|
| CN | 103167093 A | 6/2013 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| WO | 2005116851 A2 | 12/2005 |

OTHER PUBLICATIONS

Official Communication for New Zealand Patent Application No. 628161 dated Aug. 25, 2014.

Official Communication for U.S. Appl. No. 13/827,491 dated Dec. 1, 2014.

Official Communication for U.S. Appl. No. 13/827,491 dated Jun. 22, 2015.

Official Communication for U.S. Appl. No. 13/827,491 dated Mar. 30, 2016.

Official Communication for U.S. Appl. No. 13/827,491 dated Oct. 9, 2015.

Official Communication for U.S. Appl. No. 14/141,252 dated Oct. 8, 2015.

Official Communication for U.S. Appl. No. 14/225,006 dated Dec. 21, 2015.

Official Communication for U.S. Appl. No. 14/225,006 dated Feb. 27, 2015.

Official Communication for U.S. Appl. No. 14/225,006 dated Sep. 10, 2014.

Official Communication for U.S. Appl. No. 14/225,006 dated Sep. 2, 2015.

Official Communication for U.S. Appl. No. 14/225,084 dated Feb. 20, 2015.

Official Communication for U.S. Appl. No. 14/225,084 dated Jan. 4, 2016.

Official Communication for U.S. Appl. No. 14/225,084 dated Sep. 11, 2015.

Official Communication for U.S, U.S. Appl. No. 14/225,084 dated Sep. 2, 2014.

Official Communication for U.S. Appl. No. 14/225,160 dated Feb. 11, 2015.

Official Communication for U.S. Appl. No. 14/225,160 dated Jul. 29, 2014.

Official Communication for U.S. Appl. No. 14/225,160 dated May 20, 2015.

Official Communication for U.S. Appl. No. 14/225,160 dated Oct. 22, 2014.

Official Communication for U.S. Appl. No. 14/225,460 dated Aug. 12, 2015.

Official Communication for U.S. Appl. No. 14/306,138 dated Dec. 24, 2015.

(56) References Cited

OTHER PUBLICATIONS

Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Dec. 9, 2015.
Official Communication for U.S. Appl. No. 14/463,615 dated Jan. 28, 2015.
Official Communication for U.S. Appl. No. 14/463,615 dated May 21, 2015.
Official Communication for U.S. Appl. No. 14/463,615 dated Sep. 10, 2015.
Official Communication for U.S. Appl. No. 14/479,863 dated Dec. 26, 2014.
Official Communication for U.S. Appl. No. 14/483,527 dated Jan. 28, 2015.
Official Communication for U.S. Appl. No. 14/483,527 dated Jun. 22, 2015.
Official Communication for U.S. Appl. No. 14/483,527 dated Oct. 28, 2015.
Official Communication for U.S. Appl. No. 14/516,386 dated Feb. 24, 2016.
Official Communication for U.S. Appl. No. 14/516,386 dated Jun. 30, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Mar. 11, 2015.
Official Communication for U.S. Appl. No. 14/571,098 dated Nov. 10, 2015.
Official Communication for U.S. Appl. No. 14/631,633 dated Sep. 10, 2015.
Official Communication for U.S. Appl. No. 14/676,621 dated Jul. 30, 2015.
Official Communication for U.S. Appl. No. 14/676,621 dated Oct. 29, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/923,374 dated Feb. 9, 2016.
Official Communication for U.S. Appl. No. 14/923,374 dated May 23, 2016.
Official Communication for U.S. Appl. No. 15/017,324 dated Apr. 22, 2016.
Official Communication for U.S. Appl. No. 14/463,615 dated Nov. 13, 2014.
Open Web Analytics (OWA), <http://www.openwebanalytics.com/> Printed Jul. 19, 2013 in 5 pages.
Piwik—Free Web Analytics Software, <http://piwik.org/> Printed Jul. 19, 2013 in18 pages.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcount.er.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 4 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
"HunchLab: Heat Map and Kernel Density Calculation for Crime Analysis," Azavea Journal, printed fromwww.azavez.com/blogs/newsletter/v4i4/kernel-density-capabilities-added-to- -hunchlab/on Sep. 9, 2014, 2 pages.
"Refresh CSS Ellipsis When Resizing Container—Stack Overflow," Jul. 31, 2013, retrieved from internet http://stackoverflow.com/questions/17964681/refresh-css-ellipsis-when-res- izing-container, retrieved on May 18, 2015.
Amnet, "5 Great Tools for Visualizing Your Twitter Followers," posted Aug. 4, 2010, http://www.amnetblog.com/component/content/article/115-5-grate-t- ool-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Flurry Analytics, <http://www.flurry.com/> Printed Jul. 18, 2015 in 14 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Keylines.com, "An Introduction to KeyLines and Network Visualization," Mar. 2014, <http://keylines.com/wp-content/uploads/2014/03/KeyLines-White-Paper.p- df> downloaded May 12, 2014 in 8 pages.
Keylines.com, "KeyLines Datasheet," Mar. 2014, <http://keylines.com/wp-content/uploads/2014/03/KeyLines-datasheet.pdf- > downloaded May 12, 2014 in 2 pages.

(56) References Cited

OTHER PUBLICATIONS

Keylines.com, "Visualizing Threats: Improved Cyber Security Through Network Visualization," Apr. 2014, <http://keylines.com/wp-content/uploads/2014/04/Visualizing-Threats1.p- df> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Singie-user Applications through the Centralized Control Architecture," 2010, pp. 10.

Mixpanel—Mobile Analytics, <https://mixpanel.com/> Printed Jul. 18, 2013 in 13 pages.

Notice of Allowance for U.S. Appl. No. 14/225,084 dated May 4, 2015.

Notice of Allowance for U.S. Appl. No. 14/319,161 dated May 4, 2015.

Notice of Allowance for U.S. Appl. No. 14/323,935 dated Oct. 1, 2015.

Notice of Allowance for U.S. Appl. No. 14/479,863 dated Mar. 31, 2015.

Notice of Allowance for U.S. Appl. No. 14/552,336 dated Nov. 3, 2015.

Notice of Allowance for U.S. Appl. No. 14/746,671 dated Jan. 21, 2016.

Notice of Allowance for U.S. Appl. No. 14/923,364 dated May 6, 2016.

Official Communication for European Patent Application No. 14187996.5 dated Feb. 12, 2015.

Official Communication for European Patent Application No. 14191540.5 dated May 27, 2015.

Official Communication for European Patent Application No. 14200246.8 dated May 29, 2015.

Official Communication for European Patent Application No. 14200298.9 dated May 13, 2015.

Official Communication for European Patent Application No. 1518419.1 dated Sep. 29, 2015.

Official Communication for European Patent Application No. 15184764.7 dated Dec. 14, 2015.

Official Communication for Great Britain Patent Application No. 1404486.1 dated Aug. 27, 2014.

Official Communication for Great Britain Patent Application No. 1404486.1 dated May 21, 2015.

Official Communication for Great Britain Patent Application No. 1404489.5 dated Aug. 27, 2014.

Official Communication for Great Britain Patent Application No. 1404489.5 dated May 21, 2015.

Official Communication for Great Britain Patent Application No. 1404489.5 dated Oct. 6, 2014.

Official Communication for Great Britain Patent Application No. 1404499.4 dated Aug. 20, 2014.

Official Communication for Great Britain Patent Application No. 1404499.4 dated Jun. 11, 2015.

Official Communication for Great Britain Patent Application No. 1404499.4 dated Sep. 29, 2014.

Official Communication for Netherlands Patent Application No. 2012421 dated Sep. 18, 2015.

Official Communication for Netherlands Patent Application No. 20124217 dated Sep. 18, 2015.

Official Communication for Netherlands Patent Application No. 2012438 dated Sep. 21, 2015.

Official Communication for New Zealand Patent Application No. 622473 dated Jun. 19, 2014.

Official Communication for New Zealand Patent Application No. 622473 dated Mar. 27, 2014.

\* cited by examiner

BEHAVIOR SCORING

| Anchor | Spoke | Account No. | Current Risk Score | 30d Avg. Risk Score | Limit |
|---|---|---|---|---|---|
| Company 1 | Buyer 1 | 00816401820 | 6 | 7 | 6,000,000 |
| Company 2 | Buyer 2 | 00563134903 | 7 | 7 | 7,500,000 |
| Company 3 | Buyer 2 | 00315282549 | 9 | 9 | 9,000,000 |
| Company 3 | Buyer 3 | 00436789461 | 4 | 6 | 3,500,000 |
| Company 3 | Buyer 4 | 00226520154 | 8 | 7 | 5,000,000 |

Tranche Information – Account No. 00315282549

Status = NORMAL

Tranche Type = INTEREST

Amount Outstanding = 465,000

Issue Date = 04/11/2018

Maturity Date = 07/10/2018

FIG. 3

SYSTEMS AND METHODS FOR IMPLEMENTING A MACHINE LEARNING APPROACH TO MODELING ENTITY BEHAVIOR

CROSS REFERENCE TO RELATED APPLICATIONS

This application is a continuation application of U.S. patent application Ser. No. 16/028,191, filed Jul. 5, 2018, which claims the benefit under 35 U.S.C. § 119(e) of U.S. Provisional Application Ser. No. 62/668,673, filed May 8, 2018, the content of which is incorporated by reference in its entirety into the present disclosure.

TECHNICAL FIELD

This disclosure relates to approaches for modeling entity behavior.

BACKGROUND

Conventional approaches to modeling entity behavior suffer from a variety of drawbacks. For example, existing approaches may struggle to balance fixed and periodically updated information, and/or account for ongoing obligations. In large systems, the sheer volume of data may make it difficult to draw correlations between types of data in order to normalize the data for modeling. Even if a model is able to effectively evaluate the data, end users may struggle to interpret the results. Evaluating and making corrections to the model may also be problematic as end users often do not have the sophistication required to update or modify the model should one or more issues be identified. These and other drawbacks exist with conventional approaches.

SUMMARY

A claimed solution rooted in computer technology overcomes problems specifically arising in the realm of computer technology. Various embodiments of the present disclosure may include systems, methods, and non-transitory computer readable media configured to implement a machine learning approach to modeling entity behavior. The system may utilize fixed information and periodically updated information to predict the behavior of an entity. By incorporating periodically updated information, the system is able to maintain an up-to-date prediction of each entity's behavior, while also accounting for entity action with respect to ongoing obligations. Additionally, the entity's behavior may be predicted efficiently (e.g., with fewer computations) and/or at short intervals (e.g., day-to-day) based on data dependencies (e.g., as defined by a dependency graph). For example, the data dependencies may be used to identify data that needs to be updated (e.g., for ongoing obligations of the entity) when new data is received (e.g., data for a current time period).

The machine learning model utilized to predict or assess entity behavior may be trained using labeled training data. The training data may comprise data labeled based on identified classifications related to the set of entities to which the data relates. Based on these classifications, different numerical labels may be assigned to data used to train the machine learning model. These numerical labels may be modified based on how they are to be perceived relative to one another. Additional labels (or numerical values) may be applied and the labels assigned to various classifications may be modified by a user to best suit the data based on results obtained from application of the model.

When the machine learning model is applied to data related to a set of entities, behavior scores for the set of entities may be determined. Prior to applying the machine learning model, the data associated with the set of entities may be prepared (e.g., cleaned, normalized, and/or otherwise processed) to facilitate one or more operations based on the data. In an exemplary use case, the behavior scores that are generated may indicate the transactional risk associated with each entity. Using the behavior scores generated by the model in the foregoing exemplary use case, a user may be able to assess the credit riskiness of individual entities (or spokes as otherwise referred to herein) and instruct one or more individuals assigned to the entities to take one or more actions based on the credit riskiness of the individual entities.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

FIG. 3 depicts an exemplary interface presented to a user depicting data extracted and behavior scores determined, in accordance with various embodiments.

DETAILED DESCRIPTION

A claimed solution rooted in computer technology overcomes problems specifically arising in the realm of computer technology. It will be appreciated by those having skill in the art that the implementations described herein may be practiced without these specific details or with an equivalent arrangement. In other instances, well-known structures and devices are shown in block diagram form to avoid unnecessarily obscuring the implementations.

Figure 1:
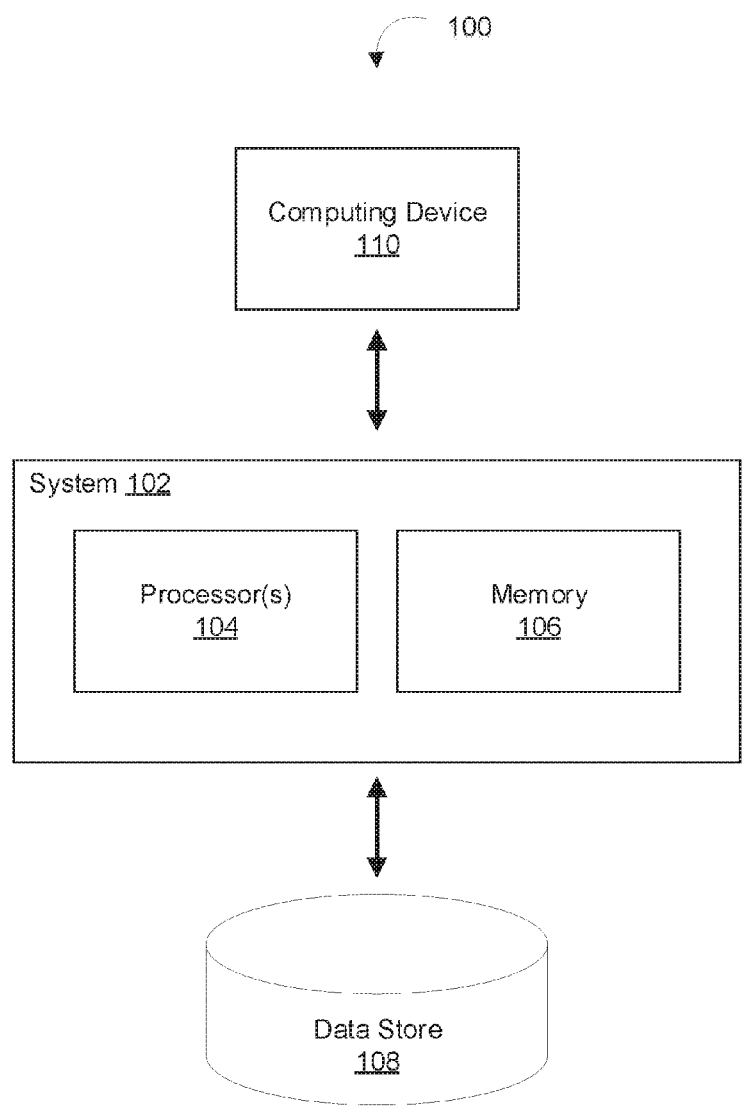
FIG. 1 depicts a diagram of an example of a system for implementing a machine learning approach to modeling entity behavior, in accordance with various embodiments.

FIG. 1 depicts a diagram of an example of an environment 100 for implementing a machine learning approach to modeling entity behavior, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. For example, memory 106 may store instructions for machine learning entity modeling engine 200 that, when executed by the one or more processors 104, cause the one or more processors 104 to perform various operations described with respect to FIG. 2. The environment 100 may also include a computing device 110 that is able to communicate with the system 102 (e.g., over one or more computer networks) and a data store 108 that is accessible to the system 102.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
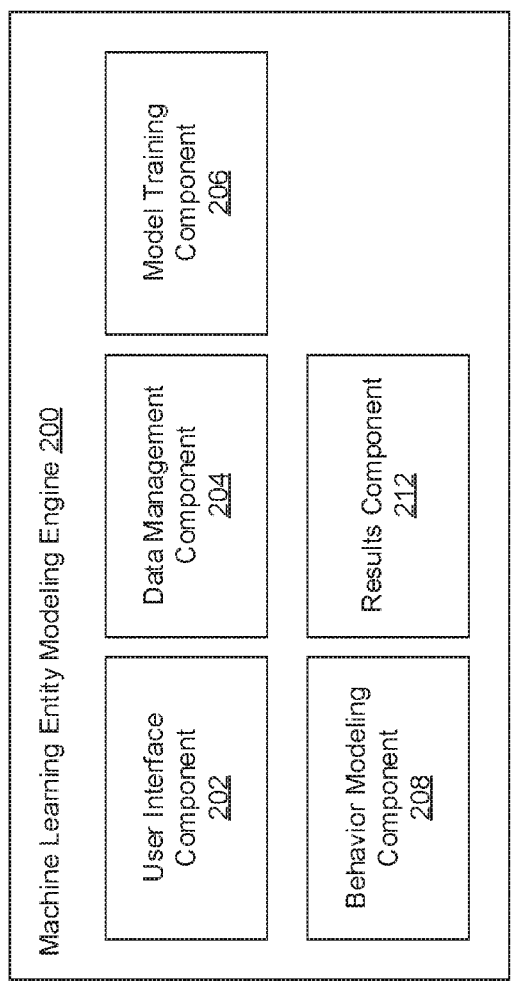
FIG. 2 depicts a diagram of an example of a machine learning entity modeling engine, in accordance with various embodiments.

FIG. 2 depicts a diagram of an example of a machine learning entity modeling engine 200, in accordance with various embodiments. In various embodiments, functionality of the machine learning entity modeling engine 200 may be performed by one or more servers, workstations, desktop computers, laptop computers, mobile devices, and/or other computing devices. In some embodiments, functionality of the machine learning entity modeling engine 200 may be performed by computing system 102. For example, the components of machine learning entity modeling engine 200 may comprise computer-readable instructions executable by processors 104. The components of machine learning entity modeling engine 200 may comprise user interface component 202, data management component 204, model training component 206, behavior modeling component 208, results component 212, and/or other computer program components. As used herein, for convenience, the various components of machine learning entity modeling engine 200 will be described as performing an operation, when, in fact, the various components comprise instructions which may program the processors 104 (and therefore computing system 102) to perform the operation.

In an exemplary implementation, machine learning entity modeling engine 200 may be configured to develop, train, and implement a model that may produce a timely indicator of a corporate client's business risk, taking into account the client's borrowing and repayment behavior. For example, machine learning entity modeling engine 200 may be configured to develop a model that treats each corporate client as an "anchor" and each of its suppliers and buyers as "spokes." For each anchor, multiple spokes may exist that are provided revolving lines of credit for the purpose of financing inventory purchases from the anchor. These lines of credit enable spokes to draw down on the line at any time, and repay early, up to the borrowing limit. In the foregoing exemplary implementation, machine learning entity modeling engine 200 may be configured to leverage the information contained in the pattern of drawdowns and repayments (i.e., "behavior") to understand the health of a supplier or buyer's business. Spokes (or suppliers and buyers) may be referred to herein as "entities." The foregoing exemplary implementation may be referred to herein as "the exemplary use case."

User interface component 202 may be configured to generate a user interface through which modeling entity behavior is facilitated. In various implementations, user interface component 202 may be configured to cause the user interface to be provided to a user through a display screen of system 102 and/or computing device 110. In some implementations, the user interface may be provided by a software application running on system 102 and/or computing device 110. In various implementations, user interface component 202 may be configured to generate a user interface through which one or more users may label data used to train a machine learning model. For example, the user interface may be configured to receive user input indicating one or more labels to assign to data used to train a machine learning model. Other user input related to the processes and results described herein may be received via a user interface generated by user interface component 202. In various implementations, user input may comprise textual input provided by a user. For example, the textual input may comprise a keyword, a phrase, a date, a string of numbers, a string of letters, an alphanumeric string, and/or one or more other forms of text-based input.

In various implementations, user interface component 202 may be configured to generate a user interface to displays data obtained and behavior scores determined. The user interface may provide a visual representation of data obtained by data management component 204 and behavior scores determined by behavior modeling component 208. In some implementations, user interface component 202 may generate a user interface depicted in FIG. 3 and cause the user interface depicted in FIG. 3 to be provided to the user.

Data management component 204 may be configured to obtain data associated with a plurality of entities and generate, update, and manage datasets based on the obtained data. In various implementations, data management component 204 may be configured to obtain data from a plurality of databases and/or datasets. In various implementations, data management component 204 may be configured to obtain data related to different intervals. For example, data management component 204 may be configured to obtain data for a set of entities related to a first time period, obtain data for a set of entities related to a second time period, and/or obtain data for a set of entities related to a third time period.

In various implementations, data management component 204 may be configured to cause data obtained to be provided to one or more other components of machine learning entity modeling engine 200. In some implementations, data management component 204 may be configured to prepare obtained data for use by one or more other components of machine learning entity modeling engine 200. For example, data management component 204 may be configured to normalize data obtained and/or generate one or more new datasets based on the data to facilitate modeling of the data by behavior modeling component 208. In various implementations, data management component 204 may be configured to obtain various types of data related to one or more of a set of entities. For example, data obtained for a given entity of the set of entities may comprise fixed data and/or periodically updated data.

Fixed data for a given entity may include profile information for an entity. For example, the profile information may include information provided directly by the entity. In some implementations, the profile information may include information obtained from a form completed by the entity. The form may be completed once and/or on a periodic basis. For example, data management component 204 may be configured to cause the form to be provided to each entity on a periodic basis (e.g., monthly, quarterly, yearly, and/or other periodic basis) based on the last time the form was provided and/or completed. The information obtained from the form may comprise basic identifying information, historical information, financial information, business plan information, and/or other information provided by an entity. Basic identifying information may include name, address, phone number, contact person, account number and/or identification number, and/or other basic identifying information. Historical information may include age of business, profile of executives of entity (e.g., prior work experience, years of management experience, and/or other profile information of executives of entity), indications of prior financial problems (e.g., bankruptcy and/or other financial issues), and/or other historical information associated with an entity. Financial information may include indications of cash flow, cash ratio, sales growth, stock turnover, asset turnover, debt service ratio, gearing ratio, profit margin, and/or other financial information associated with an entity. Business plan information may comprise indications of current and/or planned diversification, benchmarks, and/or industry prospects, a succession plan, and/or other business plan information for an entity.

Periodically updated data may comprise data for each of a set of entities that is accessible to, stored in, and/or generated by system 100. For example, the periodically updated data may include data for each of a set of entities that is accessible to, stored in, and/or generated by machine learning entity modeling engine 200. The periodically updated data may comprise transaction data for each of the set of entities associated with system 100. The periodically updated data may include an indication of the borrowing limit for each account (or entity) at one or more given times. For example, the periodically updated data may include an indication of the borrowing limit for an account (or entity) at the time the periodically updated data is updated. The periodically updated data may include an indication of the status of one or more loans or lines of credit associated with each account and/or entity. In some implementations, periodically updated data may include data that is extracted and/or generated at a predefined rate (e.g., hourly, daily, weekly, and/or other periodic basis) from one or more databases. As such, the periodically updated data may comprise a set of data that must be continuously updated in order to remain up-to-date. By incorporating periodically updated information, the system is able to maintain an up-to-date prediction of each entity's behavior, while also accounting for entity action with respect to ongoing obligations.

In the exemplary use case, the periodically updated data may comprise a record of cash transactions related to each account, wherein each account is associated with a single entity and/or each entity is associated with a single account. The periodically updated data may include each credit transaction and each debit transaction for each entity and/or account. A credit transaction may comprise a payment by an entity toward an account (e.g., a payment to offset debt liabilities). A debit transaction may comprise an action by an entity that causes the account of the entity to be debited (e.g., when an account takes out a new loan). For example, a debit transaction may comprise a draw on a line of credit, a transaction using funds in an account of the entity, and/or other transaction that causes the account of the entity to be debited.

In various implementations, data management component 204 may be configured to clean data obtained related to a set of entities. In various implementations, data obtained for each entity may comprise a plurality of entries. An entry may comprise a single data point related to one or more entities. For example, an entry may refer to data or information contained with a single cell of a dataset related to one or more entities. In various implementations, the data obtained may be ingested as strings. As such, dates, numbers, and boolean values within data obtained must be cast to the proper data types. For example, string dates may be converted to date data types, and empty strings (" ") may be converted to null values. In some implementations, the data obtained may comprise one or more datasets (i.e., one or more data tables). When the data is cleaned, the rows that represent past versions of a record may be kept or discarded.

In some implementations, data management component 204 may be configured to identify a set of correlations between entries within data obtained and one or more predefined data types. For example, data management component 204 may be configured to identify a set of correlations between each of a plurality of entries with data obtained and one or more predefined data types. The one or more predefined data types may comprise one or more data types related to information contained in fixed data and/or periodically updated data. For example, one predefined data type may comprise account status. Data management component 204 may be configured to identify a correlation between a portion and an account status of one or more entities. In some implementations, data management component 204 may be configured to convert the data for correlations have been identified into a format associated with the correlated data type. For example, data management component 204 may be configured to convert data indicating an account status of an entity that is encoded as constant codes (e.g., 1, 2, 3, or 4) into more human readable formats that are predefined and provide an indication of the meaning of each of the constant codes.

In various implementations, data management component 204 may be configured to normalize data obtained related to a set of entities in order to facilitate modeling entity behavior based on the data obtained. In some implementations, data management component 204 may be configured to generate a normalized dataset based on identified correlations between data and one or more predefined data types. For example, data management component 204 may be configured to identify, for a set of entities, that first data relates to a first data type, second data relates to a second data type, and third data relates to a third data type. In some implementations, the first data, second data, and/or third data for multiple entities may each be obtained in a different format. Data management component 204 may be configured to convert all data of a first type to a predefined format associated with the first type, convert all data of a second type to a predefined format associated with the second type, and convert all data of a third type to a predefined format associated with the third type. As such, data management component 204 may be configured to normalize data obtained for a set of entities such that each data point or piece of information appears in the same format for each of the set of entities.

The normalized dataset generated based on identified correlations between the data and the one or more predefined data types may provide each data point or piece of information in the same format for each of the set of entities. In some implementations, data management component 204 may be configured to cause the normalized dataset to be provided behavior modeling component 208, wherein the normalized dataset is analyzed by the model. As such, the model may utilize data for the set of entities that is uniform based on the data point or piece of information to which the data relates.

In various implementations, data management component 204 may be configured to identify transactions associated with the set of entities based on data obtained related to multiple time periods. For example, data management component 204 may be configured to obtain data related to a first time period and data related to a second time period different than the first time period. In some implementations, data management component 204 may be configured to compare the data related to the first time period and the data related to the second time period. Based on the comparison, data management component 204 may be configured to identify transactions that occurred involving the set of entities. For example, the data related to the first time period may comprise an indication of an account for each of the set of entities at the first time and the data related to the second time period may comprise an indication of an account for each of the set of entities at the second time. By comparing the data, data management component 204 may be configured to determine whether one or more changes occurred to the accounts between the first time period and the second time period. A change to an account would indicate the occurrence of a crediting transaction or a debiting transaction. As such, by comparing the data obtained for the first and second time period, data management component 204 may be configured to identify transactions associated with the set of entities. In various implementations, data management component 204 may be configured to generate a transaction dataset based on the identified transactions.

In various implementations, data management component 204 may be configured to extract specific data and/or one or more specific sets of data. In some implementations, data management component 204 may be configured to extract specific data and/or one or more specific sets of data from fixed data and/or periodically updated data. The extracted data may be presented to the user and/or used by the machine learning model to determine behavior scores for each entity.

In some implementations, data management component 204 may be configured to extract specific data and/or one or more specific sets of data from fixed data. For example, data management component 204 may be configured to extract, for each entity of the set of entities, specific data and/or one or more specific sets of data from the profile information of an entity. In some implementations, data management component 204 may be configured to extract, for each entity, prior assessments of the entity (e.g., previously generated behavior scores and/or scores related to a behavior score), specific client details considered in the machine learning model to generate a behavior score for a user (e.g., geographic information and/or other information considered by the model), and/or other information. For example, data management component 204 may be configured to extract an approved date for each entity, an approved credit grade for each entity, a total limit for each entity, and a scorecard key for each entity. An approved date may refer to a date information submitted by the entity was approved by a credit officer and went into effect. An approved credit grade may refer to a credit grade previously assigned to the client. A total limit may refer total borrowing limit approved for the entity. A scorecard key may refer to a foreign key link to a scorecard that was used to generate a credit grade of the entity. In some implementations, data management component 204 may be configured to extract other specific financial and/or nonfinancial information for an entity from fixed data related to the entity.

In some implementations, data management component 204 may be configured to extract specific data and/or one or more specific sets of data from periodically updated data. For example, data management component 204 may be configured to extract, for each entity of the set of entities, data and/or one or more sets of data related to an account, transactions, tranches, and/or other specific data or specific sets of data.

In various implementations, data management component 204 may be configured to extract account data for each entity. In various implementations, each account may be associated with a single entity, and each entity may be associated with only one account. In some implementations, an account may refer to a bank account. In some implementations, an account of an entity may be identified by an eleven (11) digit numerical account number. In some implementations, data management component 204 may be configured to generate an account key based on the account number.

In the exemplary use case, an account may define a single borrowing relationship between an anchor and a spoke that is parameterized by a limit and a tenor. A limit may refer to a borrowing limit for the account (or the maximum allowable amount of debit that can be taken out by a spoke). A tenor may refer to the number of days between the issue date and the maturity date of a loan (or tranche). Each spoke may be associated with a single account, however some spokes may be associated with multiple accounts. When a spoke has more than one account, this is typically because it is trading with more than one anchor. However, in some cases, a spoke may set up multiple accounts with a single anchor for accounting purposes.

In various implementations, data management component 204 may be configured to extract transaction data for each entity. Transaction data may include data and/or information related to each transaction for an entity. Transaction data may include data related to each credit transaction and/or debit transaction associated with an account or an entity. Within the transaction data, multiple transactions occurring on a particular date may be ordered by a sequence number. Transaction data may include an account balance after applying a transaction, a maturity date, an indication of an overdraft taken if the transaction was a debit, and/or other transaction data comprising data and/or information related to transactions of an entity. In the exemplary use case, debit transactions may also be referred to as overdrafts, which represent draw downs on a line of credit associated with an entity or an account. Credits represent repayments made by the spoke to the account. In some implementations, debit transactions may be associated with an indicator indicating that the debit transaction involves loan interest that is being charged and/or paid. For example, the indicator may comprise "DEBIT OF INTEREST" in a description field associated with the transaction.

In various implementations, data management component 204 may be configured to extract tranche data for each entity. A tranche may refer to a loan with fixed dates for when it is taken out (issue date) and when it is expected to be paid off (maturity date). The tranche data may comprise one or more tranche properties. For example, the one or more tranche properties may include an issue date, a maturity date, a tranche type, and/or one or more other tranche properties. The issue date may refer to the date that the tranche was created (i.e., the day that the debit transaction that created the tranche was recorded on the account). The maturity date may refer to the date by which the tranche must be repaid. The tranche type may refer to normal tranches (labeled as "NORMAL") or interest tranches (labeled as "INTEREST"). Normal tranches are drawdowns made by the client, whereas interest tranches represent interest charges that are applied to the account at periodic intervals (e.g., at the start of each month). In some implementations, data management component 204 may be configured to generate a tranche key for each tranche based on the one or more tranche properties for each tranche. In some implementations, each tranche may be associated with a single account. As such, each tranche key may be associated with a single account key. In some implementations, each account key may be associated with a single tranche (and tranche key) of each type for each issue date and maturity date pair. In the exemplary use case, accounts may have multiple debits on a single day, because individual invoices may be processed separately. In this case, data management component 204 may be configured to collapse these debit transactions (multiple debit transactions on a single day) into a single tranche.

In some implementations, the one or more tranche properties may include a paid off date, an amount outstanding, a paid off amount, an original amount, and/or one or more other tranche properties. A paid off date is the date on which a tranche was completely paid off. For example, if a tranche has been paid off as of the last updated date, this field will be populated with the date the tranche's outstanding value went to 0. An amount outstanding may comprise an amount that a tranche is still outstanding if the tranche has not been paid off as of the last updated date. A paid off amount may comprise an amount that has been repaid if the tranche has been partially repaid. An original amount may comprise the starting value of a tranche.

In various implementations, an account may accumulate a first-in-first out queue of tranches. For example, in some implementations, if a credit is applied to an account with outstanding interest tranches, credits will be applied to the first tranche (i.e., the tranche with interest that is senior to all other tranches) until it is paid off. If there are not outstanding interest tranches, a credit may be applied to pay off the earliest tranche (by issue date).

In some implementations, data management component 204 may be configured to generate one or more datasets based on extracted data. For example, data management component 204 may be configured to generate datasets comprising data gathered and extracted at periodic intervals. In some implementations, data management component 204 may be configured to generate datasets comprising data gathered and extracted daily. For example, data management component 204 may be configured to generate datasets comprising account data and tranche data gathered and extracted daily. An account dataset may comprise data related to amount outstanding, various overdue amounts (e.g., amount 15, 30, 60, and 90 days overdue), max days overdue, total amount and count of credits and debits that account made on that date (as well as credits and debit amounts to date), account balance, any surplus the account has (defined as the credits paid to date offset any debits due to date), limit utilization (defined as ratio between the balance and the limit obtained from account information), account status (e.g., either "Normal", "Overdue", "Stop Supply", or "Provisioned") and/or other information related to an account. An account dataset may be generated based on account details, transaction data, and a tranche dataset. A tranche dataset may comprise an indication the state of one or more tranches associated with one or more of a set of entities at periodic intervals (e.g., daily, weekly, monthly, etc.). A tranche dataset may indicate the amount outstanding for each tranche on each day that the tranche is active.

In various implementations, data management component 204 may be configured to update data obtained related to a set of entities. In some implementations, data management component 204 may be configured to identify dependencies between data related to a first time period and data related to a second time period. In some implementations, data management component 204 may be configured to identify dependencies between data related to a first time period and data related to a second time period, and/or data from disparate datasets, based on a dependency graph. For example, a dependency graph may map dependencies between data related to disparate time periods and/or data from disparate datasets. For example, a dependency graph may indicate that tranche data from a first time period is dependent on tranche data from a second time period and/or that certain account data is dependent on specific tranche data related to that account. In various implementations, data management component 204 may be configured to obtain a dependency graph related to one or more accounts and/or entities and identify dependencies between data based on the dependency graph. In some implementations, data management component 204 may be configured to update data based on identified dependencies between the data to be updated and other data obtained.

Model training component 206 may be configured to train a machine learning model. For example, model training component 206 may be configured to train a machine learning model utilized by behavior modeling component 208 to determine behavior scores for one or more of a set of entities. In various implementations, model training component 206 may be configured to train a machine learning model based on labeled training data.

A machine learning model uses historical data as training examples. Each example created (each of which may be defined by a row in a table) is independent from all other examples and contains features (which may be represented by datasets in individual columns of each row) derived from input data. In the exemplary use case, the input data may comprise specific data and/or one or more specific datasets. For example, the input data may comprise extracted data related to accounts, transactions, tranches, and/or other information.

In various implementations, model training component 206 may be configured to obtain data related to a predefined time period from data management component 204. At least a subset of the data may be labeled based on identified classifications for one or more of the set of entities to which the data relates. In various implementations, model training component 206 may be configured to label data based on user input indicating one or more labels for the data. For example, indications of labels to assign to the data may be obtained via user input received via a user interface generated by user interface component 202. In various implementations, model training component 206 may be configured to train the machine learning model based on the labeled data. The labeled data may otherwise be referred to as training data.

In the exemplary use case discussed above, the machine learning model may comprise a transactional risk model. The transactional risk model may evaluate a corporate client's business risk, taking into account the client's borrowing and repayment behavior. Specifically, the transactional risk model may address the need for a high-frequency measure of credit risk for client accounts in which crediting and debiting actions are continuously occurring as a result of transactions involving inventory purchases on lines of credits and payments made to repay advances on the lines of credit. The transactional risk model may utilize financial and non-financial indicators to generate credit grades (i.e., "behavior scores"). These financial and non-financial indicators may be derived from fixed data and/or periodically updated data. For example, the periodically updated data may comprise data indicating daily transactions. In some implementations, daily transaction data may be used to train the model, optimizing the model's ability to predict an undesirable event (e.g., "stop-supply") based on an entity's account behavior, as described below.

Specifying labels is a critical aspect of supervised machine learning as it specifies what outcome the model is trained to optimize against and thus predict. In the exemplary use case, one or more labels applied to data used to train the machine learning model may be based on several events (or classifications) associated with a tranche: "Account not overdue", "Account overdue by 1 day", "Account overdue by 15 days", "Account overdue by 30 days", and "Account over due by 90 days." When an account is not overdue, that means the account is not late on any payments to tranches. This is the desired state for all accounts. When an account goes overdue by 1 day, that means the account has not paid back a tranche by its maturity date. This is not considered a very big deal, because many accounts have grace periods. When an account goes overdue by 15 days, the account may be placed on a watchlist if its total amount outstanding is greater than a predefined amount. When an account goes overdue by 30 days, this may result in the account status known as "stop supply." This refers to a stop supply order issued by an anchor, which results in a spoke no longer being permitted to purchase inventory from the anchor. This can have a very large impact on the spoke, and this event is considered very undesirable. When an account goes overdue by 90 days, the account is "provisioned," which means that the account goes into recovery. This is the worst possible outcome.

These classifications may have been chosen based on the ease by which a user may understand their practical significance. Based on these classifications, different numerical labels may be assigned to data used to train the machine learning model. These numerical labels may be modified based on how they are to be perceived relative to one another. For example, in the exemplary use case in which the machine learning model comprises a transactional risk model and entity behavior is scored from 0 (least risky) to 1 (most risky), the numerical labels assigned to the various classifications may be adjusted relative to one another based on their perceived riskiness on a scale of 0 to 1. The continuous label created by these classifications may be mapped to a predefined time period (such as a 90-day window) via a linear transformation function, wherein intermediate values between the numerically labeled classifications are interpolated using a linear function. Additional labels (or numerical values) may be applied and the labels assigned to various classifications may be modified by a user to best suit the data based on the scores received.

Behavior modeling component 208 may be configured to model entity behavior for one or more of a set of entities based on data obtained related to the set of entities. In various implementations, behavior modeling component 208 may be configured to apply a machine learning model to data obtained related to a set of entities. For example, behavior modeling component 208 may be configured to apply a machine learning model to data obtained and/or provided by data management component 204. In some implementations, behavior modeling component 208 may be configured to apply a machine learning model to one or more datasets comprising data related to a set of entities that is generated, extracted, updated, or otherwise provided by data management component 204.

In various implementations, the machine learning model may comprise a random forest model. A random forest model is an algorithm which trains many decision trees and averages each tree's prediction to create scores. A decision tree is a binary tree which is split at each node based on values for a single column according to some splitting criteria (as computed versus the label column). The tree handles continuous features by identifying a splitting threshold. The model accepts some parameters as inputs. For example, the parameters may include whether to use Gini impurity, information gain, or mean-squared-error (for regression problems) as the splitting criterion; a number of features to consider when searching for the best split; a maximum depth the tree can attain (helps to prevent overfitting); a minimum number samples needed at a node to split the tree further (helps with overfitting); a minimum number samples at a leaf node (helps with overfitting); a minimum weighted fraction of inputs at a leaf node (helps with overfitting, especially when there is a large class imbalance); a maximum number of leaf nodes; class weights; and/or one or more other parameters. The random forest method is an ensemble technique which shows a randomly chosen subset of the examples and features (each drawn from the original dataset with replacement). The random forest accepts some of the same parameters as the decision tree, but, most importantly, the number of decision trees to ensemble is key to this variance minimization algorithm. The prediction for an input x, is the average:

$$\hat{f} = \frac{1}{B}\sum_{i}^{B} f_i(x)$$

where B is the number of trees, and f_i(x) is the prediction from the i-th decision tree. In an exemplary implementation, a model specification in may utilize 1000 trees, with a maximum depth of 4 and the mean-squared error as the splitting criterion.

In various implementations, behavior modeling component 208 may be configured to utilize the machine learning model to determine one or more behavior scores for each of the set of entities. For example, for each entity, the behavior modeling component 208 may be configured to determine a score of 0 to 1. In some implementations, the scores may be multiplied by a user-identified number to make the scores appear in a more user-friendly format. For example, the behavior scores from 0 to 1 may be multiplied by 10 to produce a set of behavior scores ranging from 0 to 10. In the exemplary use case, the behavior score may indicate the transactional risk associated with the entity. For example, an entity with a score of 0 may be determined to be the least risky and an entity with a score of 1 may be determined to be the most risky. Using the behavior scores generated by the model, a user may be able to assess the credit riskiness of individual entities (or spokes as otherwise referred to herein) and instruct one or more individuals assigned to the entities to take one or more actions based on the credit riskiness of the individual entities.

In the exemplary use case, the behavior score may represent an account risk score. The behavior score may be displayed in various user interfaces that are consumed by portfolio managers and credit risk officers. For example, portfolio managers and credit risk officers may view a behavior score via one or more user interfaces generated by user interface component 202. In some implementations, certain behavior scores may trigger one or more alerts to be provided to one or more users, such as one or more specific portfolio managers or credit risk officers associated with an entity for which the behavior score that triggered the alert was generated. Behavior scoring component 208 may be configured to determine that a behavior score for an entity is above or below a predefined threshold score. For example, a behavior score for an entity above a predefined threshold score may indicate that an account of the entity is at a high level of risk. In various implementations, user interface component 202 may be configured to generate an alert based on a determination that a behavior score for an entity is above or below a predefined threshold score and cause the alert to be presented to a user associated with the entity (e.g., a portfolio manager and a credit risk officer associated with the entity) via a user interface generated by user interface component 202.

Behavior scores may be used for multiple purposes. For example, in the exemplary use case, behavior scores comprising an account risk score may be used for defensive purposes and/or offensive purposes. A behavior score that indicates that an entity is at a high level of risk may prompt a user to take action to address the risk. A behavior score that indicates that an entity is low risk may prompt a user to take action to enhance the account of the entity. For example, a user may be prompted to increase an account limit or otherwise enhance an account of an entity associated with a low risk behavior score.

Results component 212 may be configured to cause a visual representation of data obtained and behavior scores determined to be provided to a user via the user interface. For example, results component 212 may be configured to cause a visual representation of data obtained and behavior scores determined to be provided to a user via a user interface generated by user interface component 202. In some implementations, results component 212 may be configured to cause a visual representation of behavior scores for a set of entities to be provided to a user along with data/information extracted for one or more of the set of entities. For example, results component 212 may be configured to cause a visual representation of behavior scores for a set of entities to be provided to a user along with tranche data extracted for at least one of the one or more entities.

For example, and referring to FIG. 3, exemplary interface 300 is illustrated depicting data extracted and behavior scores determined that may be presented to a user, in accordance with various embodiments. Exemplary interface 300 may comprise data and/or information associated with a set of entities. For example, the data and/or information associated with the set of entities depicted in exemplary interface 300 may comprise entity behavior information 302, entity specific information 304, and/or other information. Entity behavior information 302 may comprise behavior scores for a set of entities. For example, referring to the exemplary use case, entity behavior information 302 may include data or information associated with multiple accounts, wherein each account may define a single borrowing relationship between an anchor and a spoke. For each account, a current risk score, a 30-day average risk score, and a limit may be provided. The current risk score may represent a behavior score generated by behavior modeling component 208 by applying a machine learning model (e.g., a transactional risk model). Using the behavior scores generated by the model, a user may be able to assess the credit riskiness of individual entities (or spokes) and instruct one or more individuals assigned to the entities to take one or more actions based on the credit riskiness of the individual entities. Entity specific information 304 may comprise data or information associated with a single entity (or spoke) and/or a single account. For example, the entity specific information depicted in exemplary interface 300 comprises information associated with Account No. 00315282549. In various implementations, a user may select an entity or an account depicted in entity behavior information 302 in order to cause entity specific information (i.e., entity specific information 304) to appear in exemplary interface 300. Entity specific information 304 may include an account status, a tranche type, an amount outstanding, an issue date, maturity date, and/or other information associated with a specific entity or account.

In various implementations, results component 212 may be configured to determine an appropriate arrangement of the data to be provided to the user. For example, results component 212 may be configured to determine an appropriate arrangement of data obtained via data management component 204 and behavior scores determined via behavior modeling component 208 to be presented to a user via a user interface generated by user interface component 202.

Example Flowcharts of Process

Figure 4:
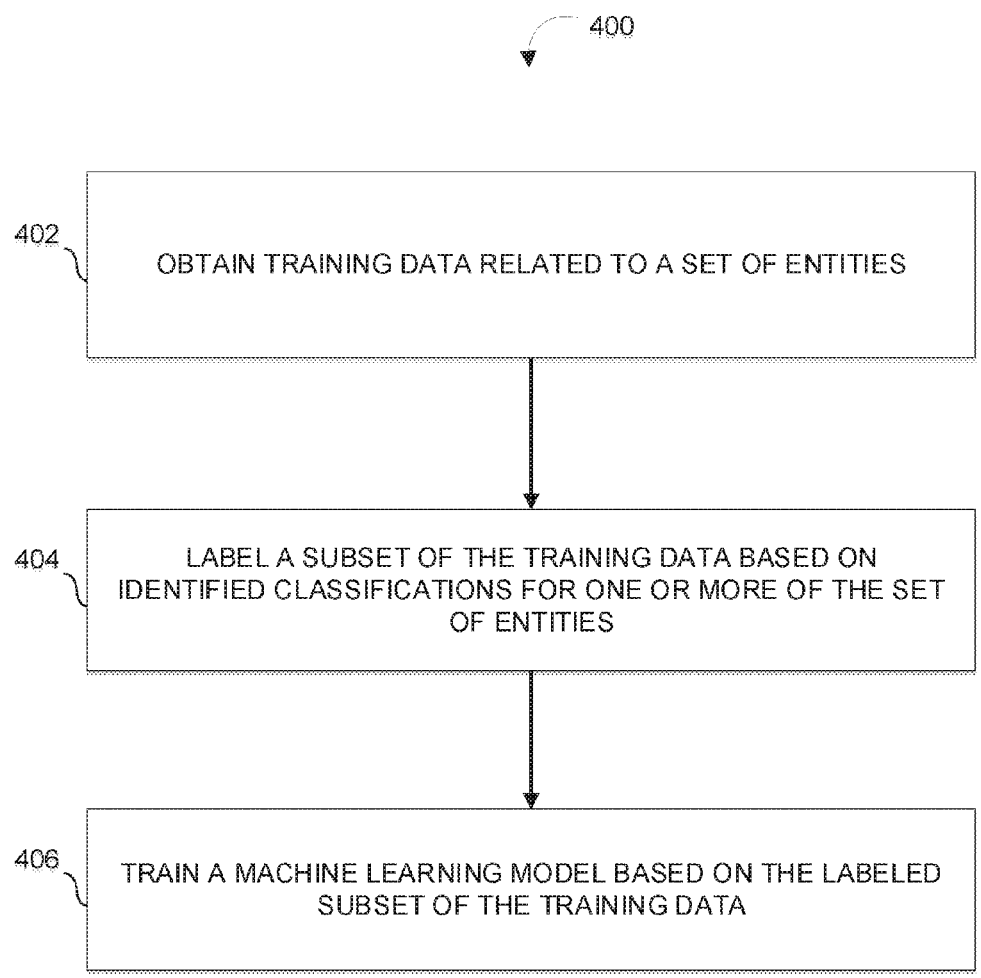
FIG. 4 depicts a flowchart of an example method for training a machine learning model based on training data related to a set of entities, in accordance with various embodiments.

FIG. 4 depicts a flowchart of an example method 400 for training a machine learning model based on training data related to a set of entities, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include obtaining training data related to a set of entities. Training data may comprise data labeled based on identified classifications related to the set of entities to which the data relates. In an operation 402, the data obtained may comprise data related to a specific time period for the set of entities intended to be used as training data to for the machine learning model. In some implementations, operation 402 may be performed by a component the same as or similar to data management component 204 (shown in FIG. 2 and described herein).

In an operation 404, method 400 may include labeling a subset of the training data based on identified classifications for one or more of the set of entities. Specifying labels is a critical aspect of supervised machine learning as it specifies what outcome the model is trained to optimize against and thus predict. In some implementations, indications of labels to assign to the data may be obtained via user input received via a user interface. The labels may be assigned to the data based on identified classifications related to the set of entities to which the data relates. The classifications may have been chosen based on the ease by which a user may understand their practical significance. Based on these classifications, different numerical labels may be assigned to data used to train the machine learning model. These numerical labels may be modified based on how they are to be perceived relative to one another. Additional labels (or numerical values) may be applied and the labels assigned to various classifications may be modified by a user to best suit the data based on results obtained from application of the model. In some implementations, operation 404 may be performed by a component the same as or similar to model training component 206 (shown in FIG. 2 and described herein).

In an operation 406, method 400 may include training a machine learning model based on the labeled subset of the training data. In some implementations, operation 406 may be performed by a component the same as or similar to model training component 206 (shown in FIG. 2 and described herein).

Figure 5:
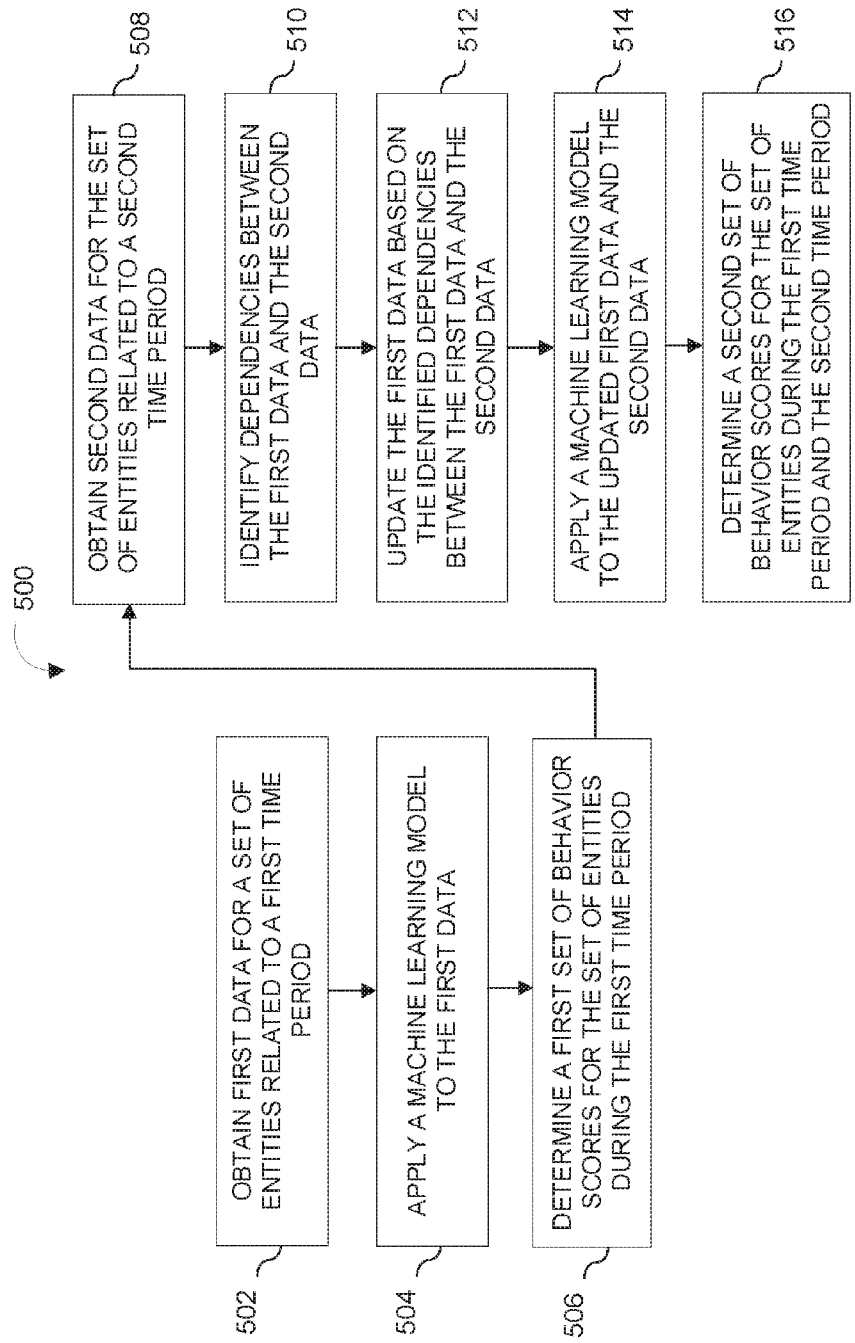
FIG. 5 depicts a flowchart of an example method for generating behavior scores for a set of entities based on a machine learning model, in accordance with various embodiments.

FIG. 5 depicts a flowchart of an example method 500 for generating behavior scores for a set of entities based on a machine learning model, in accordance with various embodiments. The operations of method 500 presented below are intended to be illustrative and, as such, should not be viewed as limiting. In some implementations, method 500 may be accomplished with one or more additional operations not described, and/or without one or more of the operations discussed. In some implementations, two or more of the operations may occur substantially simultaneously. The described operations may be accomplished using some or all of the system components described herein.

In an operation 502, method 500 may include obtaining data for a set of entities related to a first time period. The data obtained for a given entity may be obtained from one or more databases and/or datasets, and may comprise fixed data and/or periodically updated data. In some implementations, the data may be prepared (e.g., cleaned, normalized, and/or otherwise processed) to facilitate one or more operations based on the data. For example, the data may be prepared for application of a machine learning model to determine behavior scores for each of the set of entities to which the data relates. In some implementations, operation 502 may be performed by a component the same as or similar to data management component 204 (shown in FIG. 2 and described herein).

In an operation 504, method 500 may include applying a machine learning model to the data related to the first time period. In some implementations, operation 504 may be performed by a component the same as or similar to behavior modeling component 208 (shown in FIG. 2 and described herein).

In an operation 506, method 500 may include determining a first set of behavior scores for the set of entities during the first time period. For each entity, a behavior score from 0 to 1 may be determined. In some implementations, the scores may be multiplied by a user-identified number to make the scores appear in a more user-friendly format. For example, the behavior scores from 0 to 1 may be multiplied by 10 to produce a set of behavior scores ranging from 0 to 10. In an exemplary use case, the behavior scores may indicate the transactional risk associated with each entity. For example, an entity with a score of 0 may be determined to be the least risky and an entity with a score of 1 may be determined to be the most risky. In some implementations, operation 506 may be performed by a component the same as or similar to behavior modeling component 208 (shown in FIG. 2 and described herein).

In an operation 508, method 500 may include obtaining data for a set of entities related to a second time period. The data may be obtained from one or more databases and/or datasets, and may comprise fixed data and/or periodically updated data. In some implementations, the data may be prepared (e.g., cleaned, normalized, and/or otherwise processed) to facilitate one or more operations based on the data. For example, the data may be prepared for application of a machine learning model to determine behavior scores for each of the set of entities to which the data relates. In some implementations, operation 508 may be performed by a component the same as or similar to data management component 204 (shown in FIG. 2 and described herein).

In an operation 510, method 500 may include identifying dependencies between the data related to the first time period and the data related to the second time period. In some implementations, dependencies may be identified between data related to the first time period and data related to the second time period, and/or data from disparate datasets, based on a dependency graph. For example, a dependency graph may map dependencies between data related to disparate time periods and/or data from disparate datasets. In some implementations, operation 510 may be performed by a component the same as or similar to data management component 204 (shown in FIG. 2 and described herein).

In an operation 512, method 500 may include updating the data related to the first time period based on the identified dependencies between the data related to the first time period and the data related to the second time period. In various implementations, new values for the data associated with dependencies identified may be calculated based on the data related to the first time period and the data related to the second time period. In some implementations, operation 512 may be performed by a component the same as or similar to data management component 204 (shown in FIG. 2 and described herein).

In an operation 514, method 500 may include applying a machine learning model to the updated data related to the first time period and the data related to the second time period. In some implementations, operation 514 may be performed by a component the same as or similar to behavior modeling component 208 (shown in FIG. 2 and described herein).

In an operation 516, method 500 may include determining a second set of behavior scores for the set of entities during the first time period and the second time period. Using the behavior scores generated by the model in the foregoing exemplary use case, a user may be able to assess the credit riskiness of individual entities (or spokes as otherwise referred to herein) and instruct one or more individuals assigned to the entities to take one or more actions based on the credit riskiness of the individual entities. In some implementations, operation 516 may be performed by a component the same as or similar to behavior modeling component 208 (shown in FIG. 2 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs)

that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
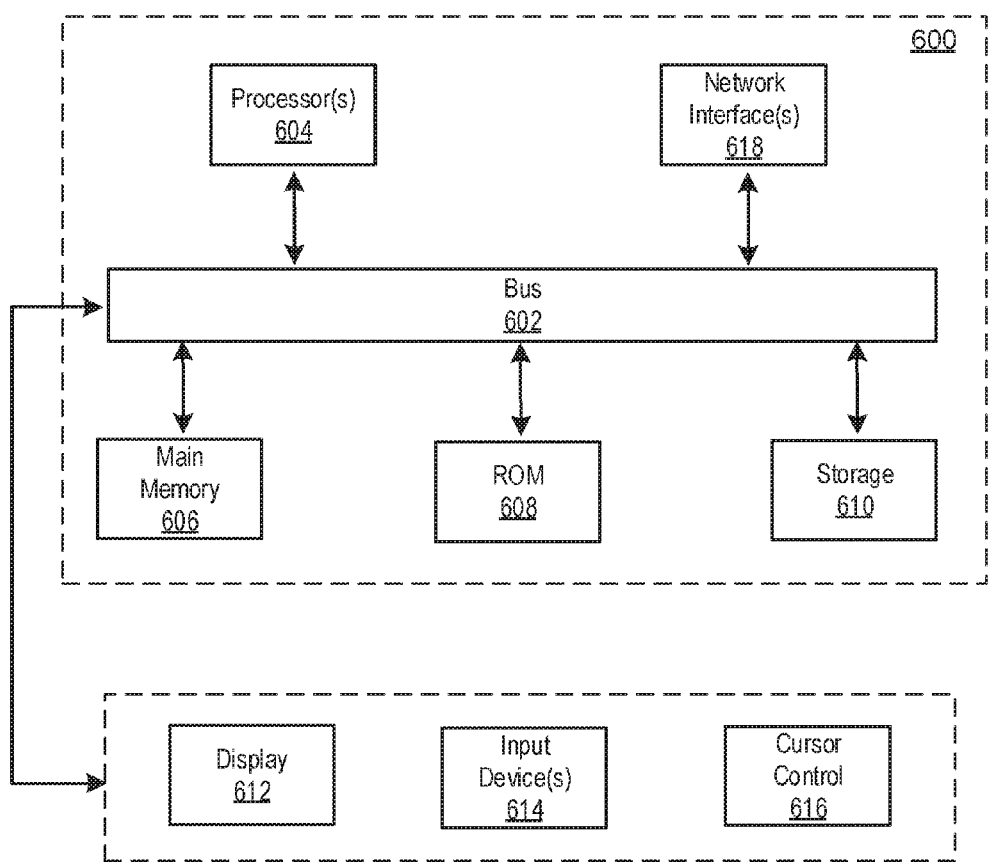
FIG. 6 depicts a block diagram of an example computer system in which any of the embodiments described herein may be implemented.

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system for implementing a machine learning approach to modeling entity behavior, the system comprising:
   one or more processors; and
   a memory storing instructions that, when executed by the one or more processors, cause the system to:
      obtain first data for a set of entities related to a first time period;
      label a subset of the first data based on identified classifications for one or more of the set of entities;
      assign numerical labels based on the identified classifications;
      obtain second data for the set of entities related to a second time period;
      obtain third data for the set of entities related to a third time period;
      identify dependencies between the second data and the third data;
      update the second data based on the identified dependencies between the second data and the third data;
      apply the machine learning model to the updated second data and the third data, wherein the machine learning model is trained to output behavior scores based on the numerical labels; and
      determine the behavior scores for each of the set of entities based on the application of the machine learning model to the updated second data and the third data.

2. The system of claim 1, wherein the second data comprises a plurality of entries, wherein the system is further caused to:
   identify a set of correlations between each of the plurality of entries and one or more data types; and
   generate a dataset comprising the plurality of entries based on the set of correlations, wherein the machine learning model is applied to the generated dataset.

3. The system of claim 2, wherein each of the plurality of entries includes one or more features, wherein to generate the dataset comprising the plurality of entries, the system is further caused to:
identify a single data type associated with each feature;
obtain an indication of a predefined format for each data type; and
convert each feature to the predefined format for the data type to which it is associated.

4. The system of claim 1, wherein the system is further caused to:
obtain access to multiple databases, wherein the multiple databases include a first database comprising fixed information for the set of entities and a second database comprising periodically updated information associated with the set of entities; and
obtain the first data from the multiple databases, wherein the first data comprises fixed information for the set of entities and periodically updated information for the set of entities related to the first time period.

5. The system of claim 1, wherein the system is further caused to:
compare the second data and the third data;
identify one or more discrepancies between the second data and the third data based on the comparison;
identify changes that have occurred involving one or more of the set of entities based on the identified one or more discrepancies; and
generate an other dataset based on the identified changes.

6. The system of claim 1, wherein to identify the dependencies between the second data and the third data, the system is further caused to:
obtain a dependency graph indicating one or more dependencies between data related to a second time period and data related to a third time period; and
identify the dependencies between the second data and the third data based on the dependency graph.

7. The system of claim 1, wherein to identify the dependencies between the second data and the third data, the system is further caused to:
obtain a dependency graph indicating one or more dependencies between data from disparate datasets; and
identify the dependencies between the second data and the third data based on the dependency graph.

8. The system of claim 1, wherein the machine learning model comprises a random forest model.

9. The system of claim 1, wherein the training the machine learning model comprises determining whether to apply Gini impurity, information gain, or mean-squared-error as a splitting criteria to split a decision tree.

10. The system of claim 1, wherein the machine learning model is based on modelling the set of entities as spokes linked to an anchor.

11. A method being implemented by a computing system having one or more processors and storage media storing machine-readable instructions that, when executed by the one or more processors, cause the computer system to perform the method, the method comprising:
obtaining first data for a set of entities related to a first time period;
labeling a subset of the first data based on identified classifications for one or more of the set of entities;
assigning numerical labels based on the identified classifications;
obtaining second data for the set of entities related to a second time period;
obtaining third data for the set of entities related to a third time period;
identifying dependencies between the second data and the third data;
updating the second data based on the identified dependencies between the second data and the third data;
applying the machine learning model to the updated second data and the third data, wherein the machine learning model is trained to output behavior scores based on the numerical labels; and
determining the behavior scores for each of the set of entities based on the application of the machine learning model to the updated second data and the third data.

12. The method of claim 11, wherein the second data comprises a plurality of entries, the method further comprising:
identifying a set of correlations between each of the plurality of entries and one or more data types; and
generating a dataset comprising the plurality of entries based on the set of correlations, wherein the machine learning model is applied to the generated dataset.

13. The method of claim 12, wherein each of the plurality of entries includes one or more features, wherein generating the dataset comprising the plurality of entries comprises:
identifying a single data type associated with each feature;
obtaining an indication of a predefined format for each data type; and
converting each feature to the predefined format for the data type to which it is associated.

14. The method of claim 11, the method further comprising:
obtaining access to multiple databases, wherein the multiple databases include a first database comprising fixed information for the set of entities and a second database comprising periodically updated information associated with the set of entities; and
obtaining the first data from the multiple databases, wherein the first data comprises fixed information for the set of entities and periodically updated information for the set of entities related to the first time period.

15. The method of claim 11, the method further comprising:
comparing the second data and the third data;
identifying one or more discrepancies between the second data and the third data based on the comparison;
identifying changes that have occurred involving one or more of the set of entities based on the identified one or more discrepancies; and
generating an other dataset based on the identified changes.

16. The method of claim 11, wherein identifying the dependencies between the second data and the third data comprises:
obtaining a dependency graph indicating one or more dependencies between data related to a second time period and data related to a third time period; and
identifying the dependencies between the second data and the third data based on the dependency graph.

17. The method of claim 11, wherein identifying the dependencies between the second data and the third data comprises:
obtaining a dependency graph indicating one or more dependencies between data from disparate datasets; and
identifying the dependencies between the second data and the third data based on the dependency graph.

18. The method of claim 11, wherein the machine learning model comprises a random forest model.

19. The method of claim 11, wherein the training the machine learning model comprises determining whether to apply Gini impurity, information gain, or mean-squared-error as a splitting criteria to split a decision tree.

20. A non-transitory computer readable medium comprising instructions that, when executed, cause one or more processors to perform:
- obtaining first data for a set of entities related to a first time period;
- labeling a subset of the first data based on identified classifications for one or more of the set of entities;
- assigning numerical labels based on the identified classifications;
- obtaining second data for the set of entities related to a second time period;
- obtaining third data for the set of entities related to a third time period;
- identifying dependencies between the second data and the third data;
- updating the second data based on the identified dependencies between the second data and the third data;
- applying the machine learning model to the updated second data and the third data, wherein the machine learning model is trained to output behavior scores based on the numerical labels; and
- determining the behavior scores for each of the set of entities based on the application of the machine learning model to the updated second data and the third data.

* * * * *